3,205,190
PLASTIC COMPOSITIONS OF IMPROVED
SLIP PROPERTIES
Harry Braus, Springdale, Ohio, and Donald R. Mills, Champaign, Ill., assignors to National Distillers and Chemical Corporation, a corporation of Virginia
No Drawing. Filed Dec. 18, 1957, Ser. No. 703,508
2 Claims. (Cl. 260—32.6)

This invention relates to plastic compositions of improved, reduced coefficient of friction, i.e., having improved slip properties. More particularly, the invention relates to solid polyolefins such as polyethylene, polypropylene, polyisoprene, etc. compositions, normally having a high film-to-film coefficient of friction, reduced with respect thereto by incorporating into said composition a small amount of elaidamide.

In accordance with this invention, plastic compositions and particularly solid polyethylene are imparted with improved slip properties by incorporating in such compositions a small amount, based upon the weight of said plastic composition, of elaidamide. In general, the amount of elaidamide utilized for incorporation into the plastic composition to be imparted with improved slip properties may be varied depending on the desired improvement in that property. Thus, the stated amide may generally be used in amounts of from about 0.01% to about 1.0% based on the weight of the plastic, and preferably in amounts of from 0.025% to 0.15%.

The improved compositions embodied herein may be prepared by any of several suitable methods known to those skilled in the art for providing a uniform mixture of the plastic and additive materials to impart a desired property. Such methods include, as applied to this invention, the addition of the stated amide as a solid, in solution in inert solvents, or as a slurry in a non-solvent, to the plastic (e.g., polyethylene) in either dry fluff or molding powder form followed by drying and tumbling. The stated amide may also be incorporated into the plastic by melt blending the ingredients in conventional apparatus, such as a Banbury mixer, heater rolls, etc.

In order to illustrate the marked improvement in slip properties (coefficient of friction) imparted to plastic compositions by practice of this invention, the following tabulation sets forth results obtained by subjecting, to test for slip properties, a (1) virgin solid polyethylene and (2) such a polyethylene to which elaidamide (98% pure) was incorporated by fusing the polyethylene in a Banbury mixer after which the fused polyethylene was admixed with the elaidamide and mixing continued for one to two minutes (250–300° F.). The homogenized concentrate was then removed from the Banbury and granulated. The concentrate of polyethylene and elaidamide was extended with polyethylene to the desired concentration by dry blending, and the resulting mixture was extruded into 1.5 mil blown film.

Coefficient of friction was measured by pulling a 333 gram metal sled enveloped in the polyethylene film to be measured at a constant speed (20 inches/minute) across another strip of the polyethylene film to be measured, using an Instron tensile tester to measure the force of friction. The measurements were carried out at 73° F. and 50% relative humidity on film aged 24 hours at these conditions.

|  | Coefficient of Friction | |
|---|---|---|
|  | A | B |
| Virgin Polyethylene | 1.1 | 0.89 (average) |
| Virgin Polyethylene plus 0.10% Elaidamide | | 0.10 |
| Virgin Polyethylene plus 0.025% Elaidamide | 0.3 | |
| Virgin Polyethylene plus 0.1% Elaidamide | 0.15 | |

Although elaidamide is utilized, as embodied herein, to improve the slip properties of the plastic composition, it has been found that elaidamide also improves the resistance of compositions to blocking, i.e., the tendency for two or more film surfaces of the plastic, e.g., polyethylene, to adhere to each other while standing under pressure. To measure such blocking characteristics, two squares of polyethylene film conditioned in the following manner were employed: A "sandwich" was prepared consisting of plate glass (4 x 4 inches), aluminum foil, polyethylene film 5 x 5 inch 1.5 mils thick, bond paper frame of 5 x 5 inch outside dimension with a 4 x 4 inch hole cut out, polyethylene film 5 x 5 inch 1.5 mils thick, aluminum foil, plate glass (4 x 4 inches), and a 4 inch diameter lead weight (4 lbs.). The "sandwich" was heated in an air circulated oven at 75° C. for fifteen minutes and removed from the oven. The weight, glass, and aluminum foil were then removed immediately and the polyethylene film sandwich smoothed onto the lower of two 4 x 4 inch aluminum plate-jaw assemblies which had double sensitive masking tape taped on the surface and the lower aluminum plate-jaw assembly fastened in the crosshead of an Instron tensile tester. The lower jaw with the polyethylene sandwich was then raised up to meet the top aluminum plate, and the paper was then removed leaving a ½ inch border of film to be secured to the back side of each plate with the masking tape. The force required to separate the two layers of film was then recorded as the crosshead with the bottom jaw was lowered.

The following tabulation illustrates the improvement in anti-block properties imparted by use of elaidamide in polyethylene with blocking characteristics being measured in accord with the aforesaid procedure.

Grams
blocking/16 in.$^2$
Virgin polyethylene _____(average)__ 543
Virgin polyethylene plus 0.10% elaidamide _____ 240

Since investigations with additive substances for imparting anti-block or slip properties to plastics, such as polyethylene, have shown that a good blocking agent is generally detrimental on the slip properties, it is evident from the foregoing data that elaidamide performs in unusual unexpected manner with respect to providing both anti-block and improved slip properties.

Although the compositions of this invention are substantially comprised of a plastic (e.g., polyethylene) containing a small amount of the stated slip-improving amide, the compositions may also contain small amounts of other desired additives, such as anti-oxidants, and others provided the additional ingredients are not present in amounts sufficient to substantially alter the effectiveness of the amides utilized in this invention for improving slip properties.

While there are above disclosed but a limited number of embodiments of the invention herein presented, it is possible to produce still other embodiments without departing from the inventive concept herein disclosed, and it is desired therefore that only such limitations be imposed on the appended claims as are stated therein.

What is claimed is:

1. A plastic composition comprising a normally solid polymer of polyethylene and from about 0.01 to about 1.0% by weight of elaidamide, based on the weight of said polymer, to reduce the coefficient of friction and blocking characteristics of said polymer.

2. A method which comprises incorporating into a normally solid polymer of polyethylene from about 0.01 to about 1.0% by weight of elaidamide, based on the weight of said polymer, sufficient to reduce the coefficient of friction of said polymer and to reduce its blocking characteristics.

References Cited by the Examiner

UNITED STATES PATENTS

| 2,770,609 | 11/56 | Symonds | 260—32.6 |
| 2,938,879 | 5/60 | Mock et al. | 260—32.6 |

FOREIGN PATENTS 1,132,791  11/56  France.

OTHER REFERENCES

Noller: Chemistry of Organic Compounds, 2nd edition, W. B. Saunders Co., Philadelphia, 1957, page 356.

The Condensed Chemical Dictionary, 6th edition, Reinhold Publishing Corp., New York (1961), page 433.

MORRIS LIEBMAN, *Primary Examiner.*

DANIEL ARNOLD, LEON J. BERCOVITZ,
*Examiners.*